United States Patent [19]

Hashimoto et al.

[11] Patent Number: 4,954,842
[45] Date of Patent: Sep. 4, 1990

[54] DIAMOND PEN TYPE MARKING DEVICE FOR SUBSTRATES

[75] Inventors: Isao Hashimoto; Tsuyoshi Hidehira, both of Ibara, Japan

[73] Assignee: Taxmo Co., Ltd., Japan

[21] Appl. No.: 220,182

[22] Filed: Jul. 11, 1988

[30] Foreign Application Priority Data

Jul. 11, 1987 [JP] Japan .................................. 62-173535

[51] Int. Cl.$^5$ ........................ G01D 15/16; G01D 15/04
[52] U.S. Cl. .................................. 346/139 R; 346/102
[58] Field of Search ........................... 346/139 R, 102

[56] References Cited

U.S. PATENT DOCUMENTS 4,166,574 9/1979 Yokoyama ........................ 346/102
4,527,108 7/1985 Enda .............................. 346/139 R

*Primary Examiner*—Mark J. Reinhart
*Attorney, Agent, or Firm*—William A. Drucker

[57] ABSTRACT

This invention relates to a pen type marking device whose marking pen tip is made of diamond and which is used for marking necessary for production control and quality control of substrates such as wafers. It features that said diamond pen type marking device is provided with a rotary absorption disk in order to take out a substrate on the main stage which is located with right angle to a substrate passage almost at the middle position of said substrate passage from a loading station to an unloading station the rotary absorption disk is furnished with a pair of absorption through-holes at the peripheral part thereof and rotated by 180 degrees intermittently, thereby continuously providing substrates to the main stage, said main stage is furnished with a pen means and its control means thereon, said pen means is of a diamond pen in a pen supporting cylinder thereof, and said pen supporting means is so composed that its pen impression pressure and pen drop speed can be freely changed by means of electric control circuits according to objectives to be marked.

2 Claims, 5 Drawing Sheets

DIAMOND PEN TYPE MARKING DEVICE FOR SUBSTRATES

BACKGROUND OF THE INVENTION

Respective inspection standards have been defined in each of the production processes of integrated circuits, and sampling inspection or 100% inspection have been severely conducted in each of such production processes. Namely, lot production control whose unit is 1 cassette (25P) or 2 cassettes (50P), etc. has been usually carried out. Also, such an inspection system as should a trouble or a defective be found in each of the production processes it can be fed back to the processes before has been adopted, in order to solve such a problem as a trouble or defective as early as possible.

For this, it is necessary to clarify the history of every wafer one by one. Therefore, every wafer has been conventionally marked with name of product, serial number, etc. in a manual manner. There is unreasonable points, e.g. imbalance of character profile (thickness, depth, size, etc. of lines) according to differences of individuals in marking jobs by hand writing (or marking). In addition, given pen impression by hand marking may damage or injure wafers. Therefore, handling wafers which are expensive need careful attention, thereby causing the marking speed to be slowed down. If marking is done with weak impression, marking itself may disappear in subsequent processes and can not be seen.

Although a method that mechanically performs this is proposed, it restricts the position to be marked, thereby causing productive problems in continuously marking on successively provided substrates. Alternately, a laser marking device has been developed. This laser melts down the surface of some area of a wafer by means of laser light and marks there with a required character size. It can indeed solve a problem of wafer damages and can contribute to stabilization of character size. However, spatters may be produced on the surface (all or in the vicinity of marking area) of said wafer when melting it down by laser light, and area in the vicinity of melting down may be built up. It will adversely influence upon the subsequent processes, especially upon light exposure process. Furthermore, there are still another problems in stabilization of laser generation device, service life of laser itself, large scaling of said device itself, and increase of the production cost.
Objects of the invention This invention is to provide a diamond pen type marking device to solve the above problems.

In details, one of the important objects of the present invention is to change the setting of pen impression of a marking pen by means of electric control circuits which is different from those of said laser device, without an aid of mechanical adjustment.

Still another important object is to automatically change said pen impression and said pen drop speed according to the objectives to be marked and to the marking character profiles.

Further important object is to contribute to acquiring uniform and high quality marking, enhancing productivity man saving and lessening the production cost by conducting continuous automation work by means of rotary absorption disk.

These and other objects of the present invention will be made apparent by the following description and explanation.

DESCRIPTION OF THE PREFERRED EMBODIMENT

Figure 1:
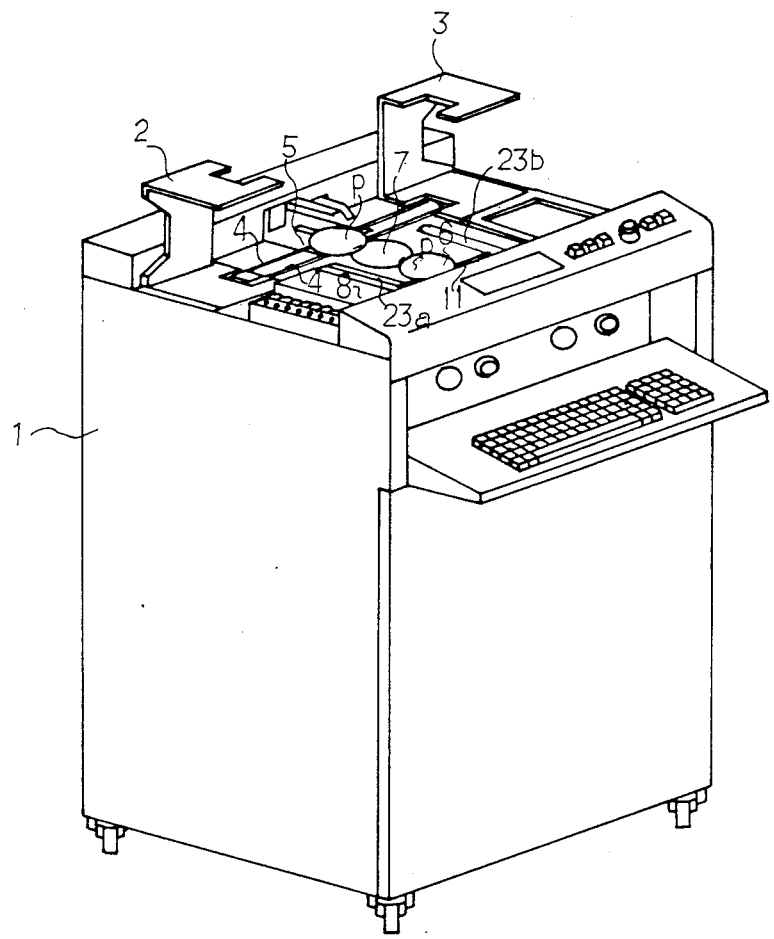
FIG. 1 is a perspective view showing the whole device.
Figure 2:
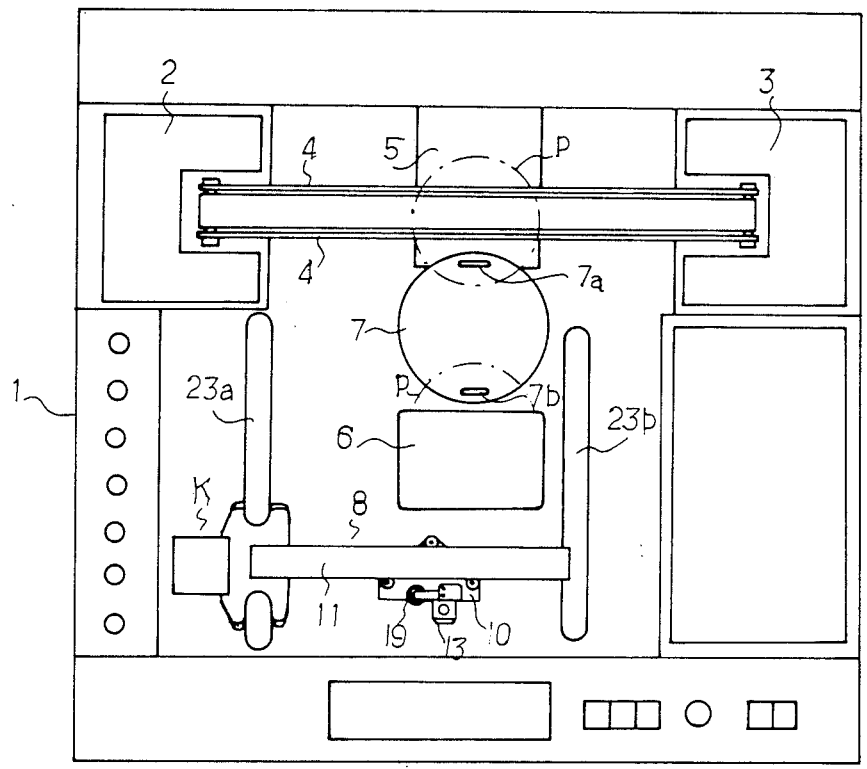
FIG. 2 is an enlarged plan view of the upper surface of said device.
Figure 3:
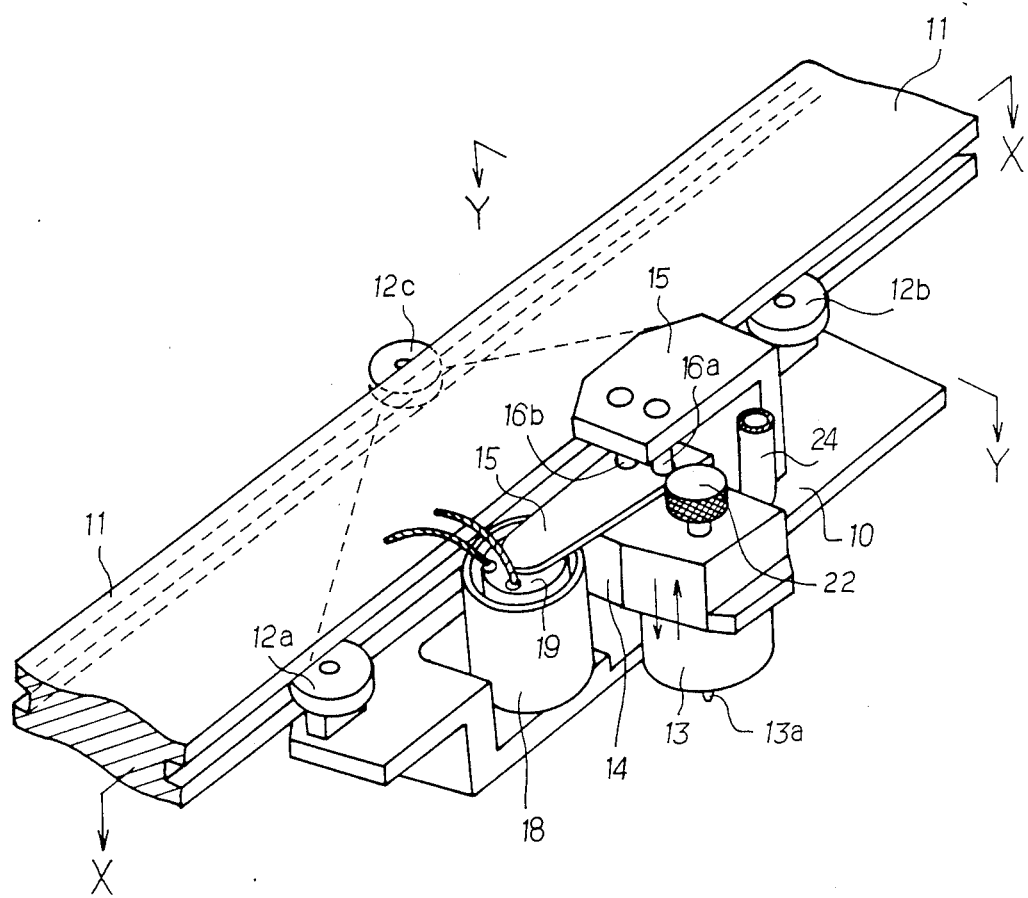
FIG. 3 is a partially perspective view of the main part of a diamond pen which is used in said device.
Figure 4:
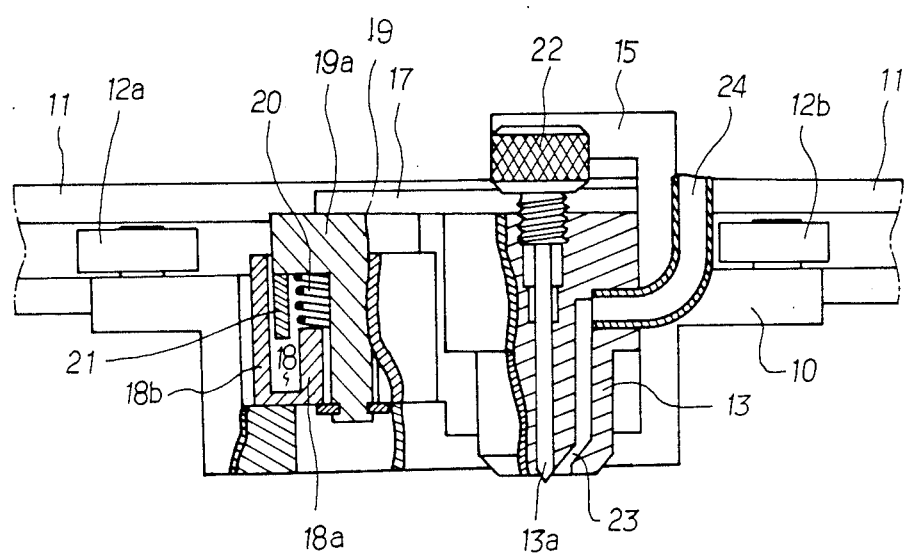
FIG. 4 is a sectional view showing the section along with the line X-X in the above FIG. 3.
Figure 5:
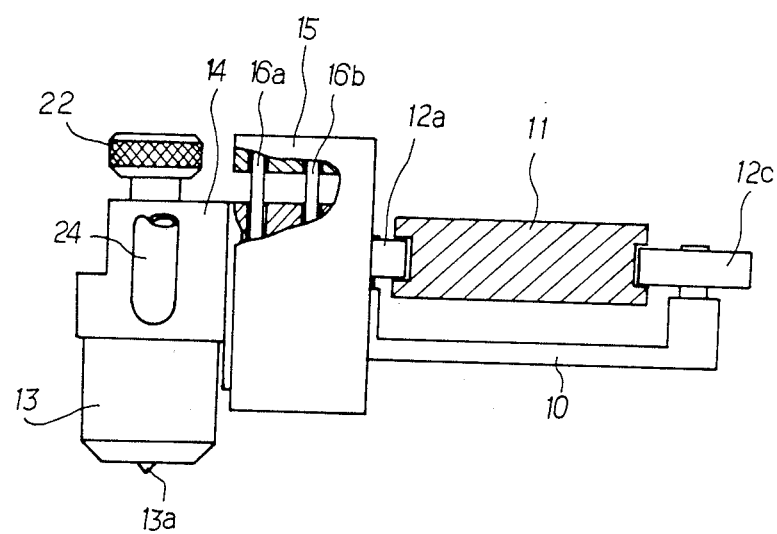
FIG. 5 is also a sectional view showing the section along with the line Y-Y in the above FIG. 4.

The whole device is indicated at (1) and is furnished with a loading station (2) and an unloading station (3) at the deep part on the upper surface thereof. A pair of round belts (4) is provided for connection between said loading station (2) and said unloading station (3) as a substrate conveying means. An alignment stage (5) is placed almost at the middle position of said substrate conveying means. The main stage (6) is arranged at the forward position which is intersected with said substrate conveying means (4).

A rotary absorption disk (7) is installed at the middle part between said alignment (5) and said main stage (6) and is furnished with a pair of absorption through-holes (7a) and (7b) at the peripheral part thereof, and each of said absorption through holes (7a) and (7b) is placed oppositely. Furthermore, said rotary absorption disk (7) is intermittently rotated by 180 degrees by a drive means (not illustrated herein).

A marking unit (8) is placed adjacent to said rotary absorption disk (7) and said alignment stage (5). This marking unit consists of a pen means, a travelling means, and a control means. Said pen means is so composed that the pen impression can be automatically variable.

Namely, a pen rest (10) can travel in the direction of length of the rail (11) which is a travelling member. In details, rollers (12a), (12b) and (12c) which are in engagement with both the sides of said rail (11) at the rear part of said pen rest (10) are slidably installed, and a pen means is arranged at the forward end of said pen rest (10). Hence, said pen means is provided with a diamond pen (13a) at the central part of a pen supporting cylinder (13), and a supporting member (14) of said pen supporting cylinder (13) is mounted at the stand (15) which is fixed with a specified height on the rest (10). By way of said supporting member (14), a diamond pen (13a) which is located at the lower part of said pen supporting cylinder (13) is so installed that it can be projected out of said rest (10) and the whole assembly thereof can be promptly slided in the direction of vertical height.

In details, said supporting member (14) which supports said pen supporting cylinder (13) is so composed that it can be guided the sliding rods (16a) and (16b) which are provided in said stand (15). At the same time, said sliding action is effected in such a manner that the leading edge of arm plate (17) which is mounted as one unit together with said supporting member (14) at the upper part thereof is connected the upper surface of the movable coil (19) in the straight drive member (18) which is installed on the pen rest (10) and that the thrust of said straight drive member (18) can be electrically controlled.

Hence, the head of said movable coil (19) is formed to be a cylindrical disk flange (19a) whose section is T-shaped, and said straight drive member (18) whose upper part is open is formed to be double-cylindrical. The height of the inner cylinder (18a) thereof is almost half that of the outer cylinder (18b) thereof and a cylinder body of said movable coil (19) is guided in said inner cylinder (18a). A spring (20) is placed between the upper edge of said inner cylinder (18a) and the lower surface of the disk flange (19a) of said movable coil (19). Usually, said movable coil (19) is kept on being lifted up upwards by aid of energy of said spring (20). And a stopper piece (21) having a specified length is installed and suspended from the lower surface of said disk flange (19a) at the periphery thereof. Then, by bringing said leading edge part into contact with the bottom surface of said double cylindrical body, movable coil (19) stops lowering at a fixed position by means of controlling the current, which is described in details later.

And adjusting screw (22) is used for promptly adjusting the projection length of the tip end of said diamond pen (13a), and an absorption hole (23) absorbs marking wastes of the tip end of said diamond pen (13a) and (24) is a vacuum absorption tube.

In said preferred embodiment of the present invention, said straight drive member (18) has different characteristics from those of a usual solenoid which has been frequently adopted as this kind of drive source. It is possible to control the thrust by electric current. Supposed that the thrust is expressed with "F" and the current is done with "I", the basic principle of the thrust of said straight drive member (18) is as follows;

Straight drive member $$F \propto I$$

Solenoid $$F \propto I^2$$

Therefore, it is found that the straight drive member has characteristics that the thrust is proportionate to input current "I".

Here in the present invention, we take note of this characteristic, and the thrust, i.e., a force by which said pen supporting cylinder (13) is pushed downward is controlled by electric current, and the pen impression setting can be instantly changed by said control circuits.

Said pen means of the above construction can freely travel on the horizontal surface on the main stage (6), that is, said pen means can travel freely by means of rails installed in the directions of X axis and Y axis. In the illustrated example, said rail (11) move said pen means in the direction of X axis and rails (23a) and (23b) move it in the direction of Y axis, respectively. A drive means for this operation is omitted and not illustrated here.

Control means (K) is furnished with a micro computer by which pen impression can be automatically adjusted according to various kinds of objectives to be marked and according to the profiles and/or type faces of characters to be marked (marking conditions).

As for operation, a substrate (P) is housed in a cassette and said cassette is set at said loading station (2). Then, said substrate (P) is taken out one by one and led to said alignment stage (5) by a pair of round belt conveying means (4). Hence, a substrate (P) is positioned in reference with orientation flat at said alignment stage (5). Said substrate is fixed by absorption on the upper surface of said rotary absorption disk (7) by means of said absorption through hole (7a). Subsequently said rotary absorption disk horizontally turns by ½ degrees and move said substrate (P) to the position of said main stage (6). As said substrate (P) reaches said main stage (6), said pen means moves by operation of said control means (K) and marks the required name of product, lot no. and substrate no. etc., at the required position of said substrate (P).

During said marking process, a next coming substrate (P) is absorbed and fixed on said alignment stage (5) by way of absorption through hole of said rotary absorption disk (7). As soon as marking is completed, said rotary absorption disk (7) turns by 180 degrees again and distributes the marked substrate (P) to said alignment stage (5) and a next coming substrate (p) to said main stage (6) respectively. Here, the marked substrate (P) is released from absorption on said rotary absorption disk (7) and is stored one after another in a cassette in said unloading station (3) by way of a pair of round belt conveying means (4). Meantime, a next coming substrate (p) is applied to marking by means of said pen means. Also, at this time, still another new coming substrate (P) is absorbed and fixed on said rotary absorption disk (7). Hence, the operation is repeated as well as in the above description.

We claim:

1. A diamond type marking device comprising:
   i. an alignment stage provided on a substrate conveying passage which carries a substrate from a loading station to an unloading station, the alignment stage aligning position of a substrate carried by the passage;
   ii. a main stage located beside said alignment stage of said substrate conveying passage;
   iii. a rotary absorption disk disposed between said alignment stage and said main stage, having a pair of absorption through-holes at opposite sides of an outer periphery of the disk for vacuum suction, wherein a through-hole fixes a substrate at the alignment stage and the other through-hole fixes a substrate at the main stage at the same time, and means for intermittently rotating the disk by 180 degrees, wherein the substrates fixed by a pair of through-holes are moved to opposite sides respectively, positions of the substrates being exchanged with each other;
   iv. the main stage having a pen means and a pen carrying means for carrying the pen means to draw an identification mark on a substrate at the main stage;
   v. said pen means being provided with a diamond pen which is supported in a pen supporting cylinder, and said pen supporting cylinder can allow pen pressure and pen drop speed to be freely and automatically changed by electric control circuit according to material or substrates to be marked.

2. A marking device for making substrates stacked in a loading station and storing marked substrates in an unloading station:
   a substrate conveying passage for conveying a substrate from the loading station to the unloading station;
   an alignment stage disposed on the substrate conveying passage for aligning a position of a substrate carried by the substrate conveying means;
   a main stage located beside the alignment stage having pen means for marking an identification or substrate disposed thereon and a pen conveying means for positioning the pen at a predetermined position to mark the identification; and a rotary absorption disk disposed between the alignment stage and the main stage, having a pair of substrate fixing means for fixing substrates respectively by vacuum suction, the two fixing means being disposed on opposite sides of the rotary absorption disk, wherein one of the fixing means fixes a substrate on the alignment stage and the other fixes a substrate on the main stage, and means for rotating the rotary absorption means, wherein positions of fixing means are exchanged with each other;

wherein said substrate conveying means conveys a new substrate form the loading station to the alignment stage when a preceding substrate is on the main stage, and said substrate conveying means conveys the preceding substrate from the alignment stage to the unloading station when the new substrate is on the main stage.

* * * * *